Dec. 5, 1933.   J. R. OISHEI   1,938,541

REAR VIEW MIRROR MOUNTING

Filed April 20, 1932

INVENTOR
BY John R. Oishei,
Bean & Brooks.
ATTORNEYS

Patented Dec. 5, 1933

1,938,541

UNITED STATES PATENT OFFICE 1,938,541

REAR VIEW MIRROR MOUNTING

John R. Oishei, Buffalo, N. Y., assignor to Trico Products Corporation, Buffalo, N. Y.

Application April 20, 1932. Serial No. 606,474

10 Claims. (Cl. 45—97)

This invention relates to metal brackets or supports and it has particular relation to brackets including reinforcing bracing members for utilization in mounting rear view mirrors upon motor vehicles.

In mounting rear view mirrors in motor vehicles it is desired to provide a construction as light as possible, and at the same time insure a firm support for the mirror. Since there is considerable vibration in the frame of a motor vehicle it is also desirable to provide a mirror support which is sturdy and not likely to be displaced from its proper adjusted position.

The object of this invention is to provide a mirror suporting bracket adapted to be composed of relatively thin light metal, and is reinforced to prevent vibration or bending during the operation of the vehicle, or during the adjustment of the mirror. Another important feature of the invention resides in minimizing the leverage from the mirror to its pivotal connection and still providing for ample limits of adjustment. To this end a projection for pivotally connecting the mirror supporting clamp to the vehicle frame is braced adjacent its end by means of members extending from a location adjacent the pivotal connection to remote portions of the brackets. This construction is so arranged that pivotal movement of the mirror clamp is provided about the bracing members adjacent the end of the projection. These members are braced to form a rigid structure, and in the event any play or looseness is developed from usage, or otherwise, they can be tightened at will.

Figure 1:
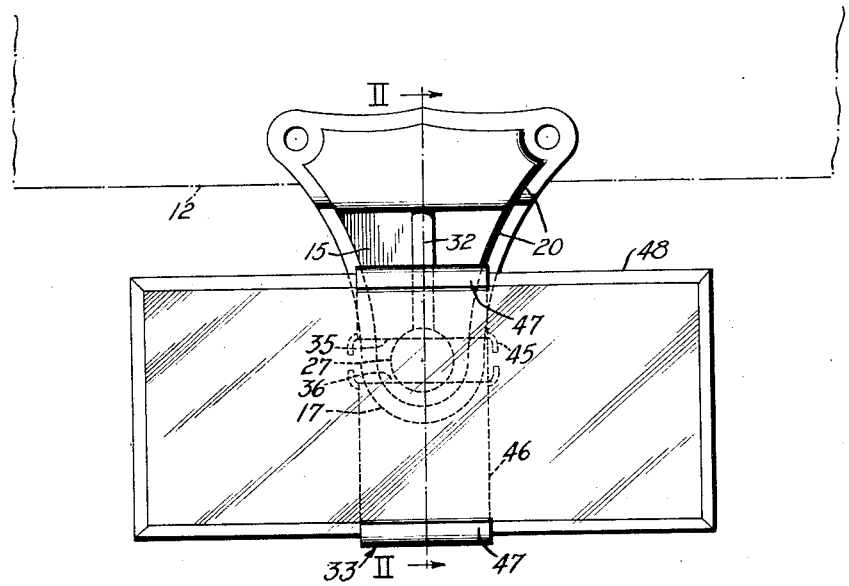
Fig. 1 is an elevation of a rear view mirror and brackets for securing it to a vehicle frame member.
Figures 2, 3, 4:
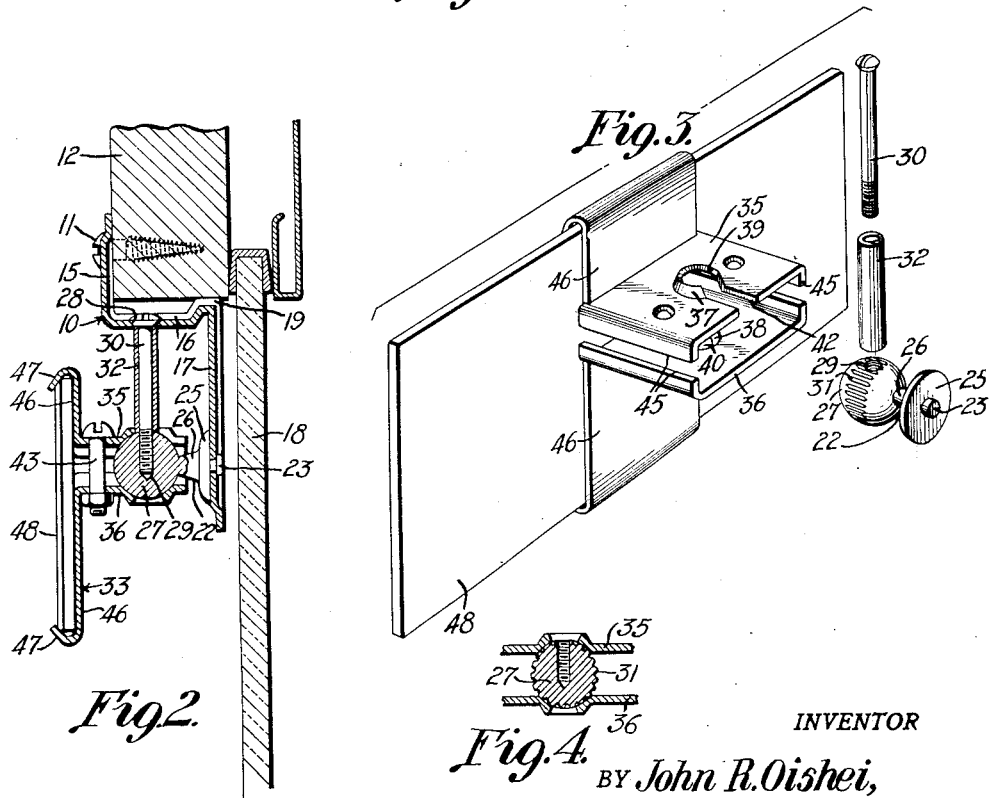
Fig. 2 is a cross section taken substantially along the line II—II of Fig. 1.
Fig. 3 is an exploded perspective of a rear view mirror with its reinforcing structure included.
Fig. 4 is a detailed sectional view.

In practicing the invention a mirror bracket 10 is rigidly secured, as indicated at 11, to a vehicle body frame member 12 and is provided with a vertical flange 15 secured directly against the frame. An intermediate horizontal web 16 of the bracket is bent at right angles to the vertical flange and extends beneath the edge of the frame member, and the bracket is bent again at right angles to form a downwardly extending flange 17 that is disposed adjacent and parallel to a conventional windshield 18. At the intersection of the horizontal web 16 and the downwardly extending flange 17, a shoulder 19 is formed that is offset upwardly for locating and bracing the bracket against the lower surface of the frame 12. The bracket is offset throughout its various portions to form an intermediate reinforcing panel 20 which serves to resist bending of the bracket.

One end of a ball support 22 is rigidly secured adjacent the lower edge of the flange 17 by means of an integral projection 23 extending through the flange and peened or spread to draw a flat base 25 of the support firmly against the surface of the flange. An intermediate shank 26 of the support integrally joins the base 25 to a ball 27 that has a knurled or serrated area 31 extending about a considerable portion of its surface. In this arrangement the ball proects outwardly from the flange 17 and is disposed in spaced relation below the horizontal web 16, and an opening 28 formed centrally in the web is substantially in vertical alinement with a screw threaded opening 29 extending toward or facing the opening 28 in the web. A bolt 30 is disposed through the opening in the web and through a sleeve 32, and is screw-threaded into the opening 29 in the ball. By tightening the bolt 30, opposite ends of the sleeve bind firmly against the opposed surfaces of the web and ball. Thus the ball support is reinforced and firmly secured against movement in any direction with respect to the brackets.

A mirror support 33, comprising a pair of plates 35 and 36 are mounted for universal movement upon the ball, is composed of relatively thin metal, and the plates are provided with struck out upper and lower socket portions 37 and 38 having openings 39 and 40 facing in opposite directions. A slot 42 extending from the edge of the plate 35 into the upper opening 39 is sufficiently wide to receive the bolt 30 and sleeve 32, and the opening 39 is sufficiently large to provide free relative movement of the sleeve therein for the purpose of insuring universal movement of the support about the ball 27. The plates 35 and 36 are adjustably bolted together, as indicated at 43, whereby the plates can be tightened about the ball. Reinforcing side flanges 45 are formed along the edges of the plates and additional flanges 46 having their outer edges bent, as indicated at 47, embrace and rigidly secure a rear view mirror 48 in clamping relation.

From the foregoing description it will be apparent that the braced construction of the flange 17 and web 16 by means of the reinforcing bolt 30 and sleeve 32, together with the bracing action of the shoulder 19 against the lower edge of the frame 12, provides a firm and durable mounting for the rear view mirror support wherein there is no danger of loosening the ball support or bending the metal elements. Very thin metal can be employed for the brackets and clamping members and still retain adequate strength and rigidity. The degree of clamping force upon the ball 25 is minimized because the serrated area 31 provides a superior gripping surface for the clamping members. Since only a limited degree of universal movement is required to accommodate the various necessary adjustments of the rear view mirror, the opening 39 provides for adequate movement of the sockets 37 and 38. The mirror support can be replaced without disassembling the ball support or any of the reinforcing elements of the bracket.

Although only one form of the invention has been shown and described in detail, it will be apparent to those skilled in the art that the invention is not so limited, but that various change may be made therein without departing from the spirit of the invention or from the scope of the appended claims.

I claim:

1. A rear view mirror supporting structure comprising a bracket, means for securing the bracket to a vehicle frame, a projection extending rigidly from the bracket, a bracing member extending from the projection to a remote portion of the bracket, and a mirror clamp pivotally mounted upon the projection.

2. A rear view mirror supporting structure comprising a bracket means for securing the bracket to a vehicle frame, a projection extending rigidly from the bracket, a bracing member extending from the projection to a remote portion of the bracket, a mirror clamp pivoted upon the projection, and means for tightening the bracing member to provide a rigid structure of the bracket projection and bracing member.

3. A rear view mirror supporting structure comprising a bracket, means for securing the bracket to a vehicle frame, a projection extending rigidly from the bracket, a bracing member extending from the projection to a remote portion of the bracket, a mirror clamp pivotally secured upon the projection, a spacing member confined between the projection and the bracket, said bracket, projection and bracing member having means for tightening the bracing member and binding the spacing member between the bracket and the projection.

4. A rear view mirror supporting structure comprising a bracket, means for securing the bracket to a vehicle frame, a projection extending rigidly from the bracket, a bracing bolt extending through the bracket at a location spaced from the projection, said projection having a threaded opening for receiving the bolt, a spacing member mounted upon the bolt whereby the clamping of the bolt binds the spacing member between the bracket and projection to form a rigid construction, and a mirror clamp pivotally secured upon the projection, said clamp being provided with portions loosely extending about the bracing member to facilitate pivotal movement of the clamp.

5. A rear view mirror supporting structure comprising a bracket, means for securing the bracket to a vehicle frame, a projection extending rigidly from the bracket, a bracing bolt extending through the bracket at a location spaced from the projection, said projection having a threaded opening for receiving the bolt, a sleeve surrounding the bolt whereby the tightening of the latter binds the sleeve between the bracket and the projection to form a rigid construction, and a mirror clamp having a universal connection to the projection, said clamp being provided with portions loosely extending about the bracing member to facilitate universal movement of the flange.

6. A rear view mirror supporting structure comprising a bracket having a central web portion and end portions bent angularly therefrom, means for securing the bracket to a vehicle frame, a projection rigidly extending from one of said portions, a bracing member extending from another of said portions to the projection to form a rigid construction of bracket, projection and bracing member, and a mirror clamp pivotally mounted upon the projection.

7. A rear view mirror supporting structure comprising a bracket having a central web portion and end portions bent angularly therefrom, means for securing the bracket to a vehicle frame whereby the corner of one of the bent portions is abutted firmly against the frame, means for securing the bracket to the vehicle frame, a projection rigidly extending from one of the angular portions, a bracing member extending from the web portion to the projection, means for tightening the bracing member against the projection and web to form a rigid construction of bracket, projection and bracing member, and a mirror clamp pivotally mounted upon the projection.

8. In a bracket structure, a metallic plate having a central web portion and end portions bent angularly therefrom, said plate having securing means and a locating shoulder for mounting it upon a support, a projection having a base rigidly secured to one of said end portions, a bracing member connected to the web portion and to the projection, a spacing member confined between the web portion and the projection, said bracing member being provided with means for tightening the spacing member between the web and projection, and socket members mounted upon the end of the projection about the bracing member to provide a universal connection.

9. In a bracket structure, a metallic plate having a central web portion and end portions bent angularly therefrom, said plate having securing means and a locating shoulder for mounting it upon a support, a projection having a base rigidly secured to one of said end portions, a bracing member connected to the web portion and to the projection, a spacing member confined between the web portion and to the projection, said bracing member being provided with means for a tightening the spacing member between the web and projection, and socket members mounted upon the end of the projection about the bracing member to provide a universal connection, one of the socket members being separated to resist relative movement of the socket members.

10. A rear view mirror supporting structure comprising a bracket having angular portions, means for securing one of the angular portions to a vehicle frame, members extending from the angular portion and intersecting at a point spaced from the surface of the angular portion, means for securing said members in braced relation with each other and with the angular portions, one of said members having a serrated portion, and a rear view mirror clamp secured about the separated portion for frictional universal movement thereon.

JOHN R. OISHEI.

CERTIFICATE OF CORRECTION.

Patent No. 1,938,541. December 5, 1933.

JOHN R. OISHEI.

It is hereby certified that error appears in the printed specification of the above numbered patent requiring correction as follows: Page 1, line 75, for "proects" read projects; page 2, lines 136 and 148, claims 9 and 10, respectively, for "separated" read serrated; and that the said Letters Patent should be read with these corrections therein that the same may conform to the record of the case in the Patent Office.

Signed and sealed this 6th day of February, A. D. 1934.

F. M. Hopkins (Seal)  Acting Commissioner of Patents.